(12) United States Patent
Earl

(10) Patent No.: US 6,721,907 B2
(45) Date of Patent: Apr. 13, 2004

(54) SYSTEM AND METHOD FOR MONITORING THE STATE AND OPERABILITY OF COMPONENTS IN DISTRIBUTED COMPUTING SYSTEMS

(75) Inventor: William J. Earl, Boulder Creek, CA (US)

(73) Assignee: Zambeel, Inc., Fremont, CA (US)

( * ) Notice: Subject to any disclaimer, the term of this patent is extended or adjusted under 35 U.S.C. 154(b) by 0 days.

(21) Appl. No.: 10/170,820

(22) Filed: Jun. 12, 2002

(65) Prior Publication Data

US 2003/0233594 A1 Dec. 18, 2003

(51) Int. Cl.[7] ............................................... G06F 11/00
(52) U.S. Cl. ........................................................ 714/57
(58) Field of Search ............................. 714/55, 57, 45; 709/249

(56) References Cited

U.S. PATENT DOCUMENTS 6,079,033 A * 6/2000 Jacobson et al. .............. 714/47
6,324,572 B1 * 11/2001 Silverman et al. ........... 709/215
2002/0138551 A1 * 9/2002 Erickson ...................... 709/203
2003/0046286 A1 * 3/2003 Jacobs et al. .................... 707/8

OTHER PUBLICATIONS

PCT Search Report dated Aug. 18, 2003 corresponding to PCT/US03/18615.

* cited by examiner

Primary Examiner—Scott Baderman
(74) Attorney, Agent, or Firm—Gray Cary Ware & Freidenrich LLP

(57) ABSTRACT

A system and method for monitoring the state and operability of components in distributed computing systems. The present invention indicates whether a component is operating correctly, and reliably distributes the state of all components among the elements of the system by means of a reliable multicast protocol. A Life Support Service (LSS) update service enables clients to record, retrieve, and distribute state information locally and remotely via table entries. An LSS heartbeat service enables prompt delivery of notice of failure to all components.

32 Claims, 7 Drawing Sheets

Update Notification—Lookup

Overflow Notification—Rescan

Normal Operation

Normal Operation

Dropped Data Packet

Dropped Data Packet

Dropped Data Packet/NAK

SYSTEM AND METHOD FOR MONITORING THE STATE AND OPERABILITY OF COMPONENTS IN DISTRIBUTED COMPUTING SYSTEMS

TECHNICAL FIELD

The present invention relates generally to computing systems, and more particularly to a system and method for monitoring the state and operability of components in distributed computing systems. The present invention indicates whether a component is operating correctly, and reliably distributes the state of all components among the elements of the system.

BACKGROUND OF THE INVENTION

In any distributed computing system, it is desirable to monitor the state of the various components (e.g., to know which components are operating correctly and to detect which ones are not operable). It is further desirable to distribute the state of all components among the elements of the system.

In known prior art, "heartbeats" sometimes referred to as "I'm alive" packets are used to distribute the state of all components. Particularly, these types of packets are employed in computing systems that use a point-to-point messaging mechanism, and in cluster membership services that use a type of ring topology where messages are sent from one machine to the next in a chain including a list of current members. However, in all of these prior implementations, each machine sends a packet to every other machine, thereby requiring an $N^2$ algorithm to distribute state information. To reduce the number of messages from order $N^2$ to order n, the present invention uses a reliable multicast protocol to distribute state information.

SUMMARY OF THE INVENTION

According to the disclosed embodiments, a method and system is provided for determining whether a given component in a distributed computing system is operating correctly, and for reliably distributing the state of the components among all the elements of the system.

One non-limiting advantage of the present invention is that it provides an update service that allows local processes to record, retrieve and distribute state information via table entries in a relational table.

Another non-limiting advantage of the present invention is that it provides an update service that allows processes on a given machine to communicate with a local agent of the update service using a reliable protocol.

Another non-limiting advantage of the present invention is that it provides an update service including a Life Support Service (LSS) process that stores information in separate relational tables for the various types of processes within a distributed computing system.

Another non-limiting advantage of the present invention is that it provides an update service that allows read-write access to relational tables to the LSS process while allowing read-only access to the local processes, which may perform lookups or rescans of the local relational tables.

Another non-limiting advantage of the present invention is that it provides an update service that allows multiple processes on a given machine to perform lookups into the same or different relational tables in parallel without contention and without communication with a server by using a non-blocking coherency algorithm.

Another non-limiting advantage of the present invention is that it provides an update service that allows a specific local process to perform a rescan using a batch processing mechanism when notified of a large number of updates.

Another non-limiting advantage of the present invention is that it provides an update service that allows local updates to be propagated to all other LSS processes in the system.

Another non-limiting advantage of the present invention is that it provides a "heartbeat" service that promptly delivers failure notifications.

Another non-limiting advantage of the present invention is that it provides update and heartbeat services that are "lightweight" and greatly simplified as a result of using a reliable protocol.

According to one aspect of the present invention, a system is provided for monitoring state information in a distributed computing system, including a plurality of nodes which are coupled together by at least one switching fabric. The system includes an update service including a plurality of local applications, each of the local applications respectively residing on a unique one of the plurality of nodes and being adapted to record and update state information from local clients in a local relational table, and a system-wide application which is adapted to propagate the updated state information across the distributed computing system to a plurality of the local relational tables. The system may also include a heartbeat service which is adapted to selectively generate and receive messages throughout the system to indicate whether the components of the system are operating normally.

According to a second aspect of the invention, a distributed file system is provided. The distributed file system includes at least one switching fabric; a plurality of nodes which provide at least one file system service process, and which are communicatively coupled together by the at least one switching fabric; a plurality of local update service applications that respectively reside upon the plurality of nodes and which update state information from local clients on the plurality of nodes in a plurality of local relational tables; and a system wide update service application which communicates updated state information across the distributed file system to a plurality of local relational tables.

According to a third aspect of the invention, a method of monitoring the state of components in a distributed computing system is provided. The distributed computing system includes a plurality of interconnected service nodes, each including at least one local client. The method includes the steps of: monitoring the state of the local clients on each service node; updating information relating to the state of the local clients in a plurality of local relational tables respectively residing on the plurality of service nodes; and communicating the updated state information to the local relational tables on the service nodes over a multicast channel.

These and other features and advantages of the invention will become apparent by reference to the following specification and by reference to the following drawings.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration. The preferred embodiment of the present invention will be described herein with reference to an exemplary implementation of a fault-tolerant service in a distributed computing environment. However, the present invention is not limited to this exemplary implementation, but can be practiced in any computing environment including a distributed storage system.

Figure 1:
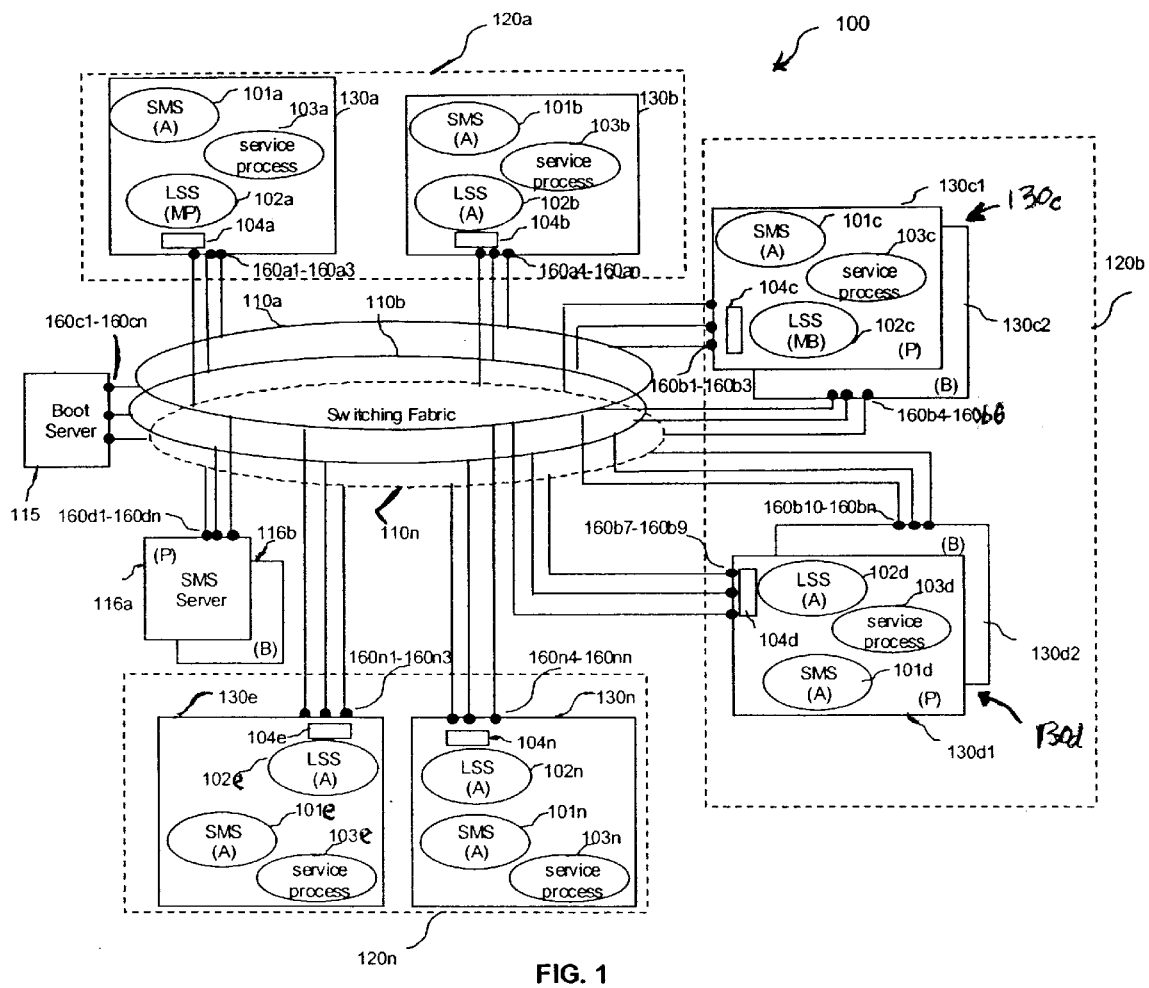
FIG. 1 is a block diagram of an exemplary distributed, highly scalable computing system 100 incorporating one embodiment of a system and method for monitoring and reliably distributing the state of components in the system.

Referring now to FIG. 1, there is shown an exemplary distributed, highly scalable computing system 100 incorporating a system and method for monitoring and updating the state of components according to one embodiment of the invention. The distributed computing system 100 includes service nodes 130a–130n, a boot server 115 that is responsible for loading software onto newly activated services, and a Systems Management Server (SMS) pair 116a, 116b that is responsible for system management services such as starting, stopping, and rebooting service nodes. (In general, "n" is used herein to indicate an indefinite plurality, so that the number "n" when referred to one component does not necessarily equal the number "n" of a different component. For example, the number of service nodes 130a–130n need not, but may, equal the number of services 120a–120n.)

Each node within system 100 is connected by use of an interface 160a1–160an/160b1–160bn/160c1–160cn/160d1–160dn/160n1–160nn to at least a pair of switching fabrics 100a–110n, which may comprise for example, but without limitation, switched Internet Protocol (IP) based networks, buses, wireless networks or other suitable interconnect mechanisms. Switching fabrics 110a–110n can provide connectivity to any number of service nodes, boot servers, or function-specific servers such as the SMS Server pair 116a, 116b, which is a management entity.

Each service node 130a–130n in system 100 includes at least one service process 103a–103n, which can be, for example but without limitation, a gateway process, metadata process, or storage process. Each service node 130a–130n can be a single service instance (e.g., service node 130a, 130b, 130e or 130n), or a primary service instance (e.g., service node 130c1 or 130d1) and one or more backup service instances (e.g., service node 130c2 or 130d2). The primary service instance and its one or more backup service instances in most cases reside on separate physical machines to ensure independent failure, thereby avoiding the primary service instance and its one or more backup service instances failing together. Services 120a–120n, regardless of whether they provide a single service instance or primary and backup service instances, typically provide different functions within a distributed computing system. For example, but without limitation, one service may provide a distributed, scalable, and fault-tolerant metadata service (MDS), while another may provide a distributed, scalable gateway service, a distributed scalable storage service, or some other service. Examples of metadata, gateway and storage services are described in U.S. patent application Ser. No. 09/709,187, entitled "Scalable Storage System," which is assigned to the present assignee, and which is fully and completely incorporated herein by reference.

Each service node 130a–130n in system 100 also includes a Life Support Service (LSS) process 102a–102n, which provides two distinct services to its clients. (In this context, a client is any process that is running in the same machine as the LSS process.) The LSS process provides an update service, which enables its clients to record and retrieve table entries in a relational table. It also provides a "heartbeat" service, which determines whether a given path from a node into the fabric is valid. The LSS process is a real-time service with operations that are predictable and occur in a bounded time, such as within predetermined periods of time or "heartbeat intervals." Both services have two distinct applications, local and system-wide. These services are detailed below.

All LSS processes may run the same (or substantially identical) software, but may serve different functional roles. In the preferred embodiment, an LSS process running on a service node could be a monitor primary (MP), a monitor backup (MB) or an agent (A). For example, an LSS process that is functioning as an agent may handle application-level updates and heartbeats, which are local to a particular machine and can cause these updates to be propagated to the monitors. A monitor backup may provide these same update and heartbeat services and also participate in the election of a new monitor primary. A monitor backup may also be eligible to become the monitor primary. A monitor primary provides the application-level update and heartbeat services, elects itself monitor primary, and is responsible for propagating state changes throughout the system.

Two or more LSS processes act as monitors within system 100, while the remaining LSS processes act as agents of these monitors. In the preferred embodiment, only one monitor primary, which mediates updates throughout the system, can exist in the distributed computing system. 100, but one or more monitor backups can exist in the distributed computing system 100. Monitors may be pre-configured as the location where the LSS software resides, while agents download the LSS software at network boot time. All monitors communicate with each other (and with the agents within the system) using a multicast protocol. Each monitor notices other monitors present on the switching fabric. The "lowest numbered" machine elects itself as the monitor primary provided it can get acknowledgments from the other nodes, and the other nodes can see its messages. Lowest numbered in this context means the machine with the numerically smallest identifier. That is, each machine has a unique numeric identifier assigned during manufacturing (e.g., an Ethernet controller MAC address), and the machine having the lowest numeric identifier is elected. It should be appreciated that any predicate that selects a primary monitor based on a unique attribute of a machine is sufficient, and that this particular predicate (i.e., "lowest numbered") is just an example.

In the preferred embodiment, only the monitors (i.e., the monitor primary process and the monitor backup processes) can participate in the election of a monitor primary. Limiting the number of monitors can improve performance for electing a current monitor primary. It should be noted that the present invention allows the packets and messages that an LSS process sends or receives across the switching fabric to be sent or received directly by the LSS process or mediated by another layer of communication software 104a–104n. The methods of mediation that may be performed by another layer of software are not within the scope of this invention and will not be described herein. In addition, the present invention described herein will not discuss the use of another layer of communication software to mediate communication between a local LSS process and an LSS monitor (e.g., a monitor primary or monitor backup(s)). However, this should not be construed as limiting.

Each service node 130a–130n in system 100 also includes an SMS agent process 101a–101n, which is a managed entity used by a management entity, such as the SMS Server pair 116a–116b, to remotely manage a service node, that is, to start, stop, and reboot a service node.

In accordance with the principles of the present invention, these components are provided for purposes of illustration only and are not limiting. The services can be any service, for example but not limited to, a highly scalable service and a fault-tolerant service. Of course, while only three services (i.e., services 120a, 120b, 120n), two SMS Servers (i.e., servers 116a, 116b) and a boot server 115 are shown, many more of each of these services and servers may be connected to one another via switching fabrics according to the present invention.

Update Service

In accordance with the embodiments of the present invention, the update service is an efficient and reliable mechanism for monitoring and distributing state information in a distributed computing system. The update service enables clients of the LSS process to record, retrieve, and distribute state information through table entries in a relational table, which may comprise a shared memory segment that can be accessed by every process running on a local machine. Using the local application of the update service, local processes can update a local relational table residing on the their respective local machines. Except for the entries in a host route table, the local machine (source) is the sole authority for the entries in the tables resident in the local machine. Using the system-wide application of the update service, an LSS process may cause its local updates to be propagated to all other LSS processes in the system. Specifically, an LSS process may propagate state information to the monitor primary (and monitor backups) so that the same relational table counterpart residing on all machines in the system can be updated. In this manner, every machine within the system has a reliable single view of the state information.

In the preferred embodiment, the LSS process maintains a set of tables of addressing information. Most such tables are used to address particular classes of service instances (where a service instance is a process which provides an instance of a class of service, such as a metadata service). One table is used to address machines. Service instances may be addressed as a machine and port number. Machines may be addressed by one or more IP addresses. The key of the host route table is of the form "machineIdentifier.sequenceNumber", where "machineIdentifier" is a representation of the machine's unique identifier and "sequenceNumber" is arbitrarily assigned to distinguish the various entries for a given machine (host). The value of the entry is the corresponding IP address. For example and without limitation, entries may be as follows:

| | |
|---|---|
| z-a1357.0 | 10.2.3.4 |
| z-a1357.1 | 10.2.4.4 |
| z-a1358.0 | 10.2.3.19 |
| z-a1358.1 | 10.2.4.12 |

The use of entries and the host route table are described more fully and completely below.

Figure 2A:
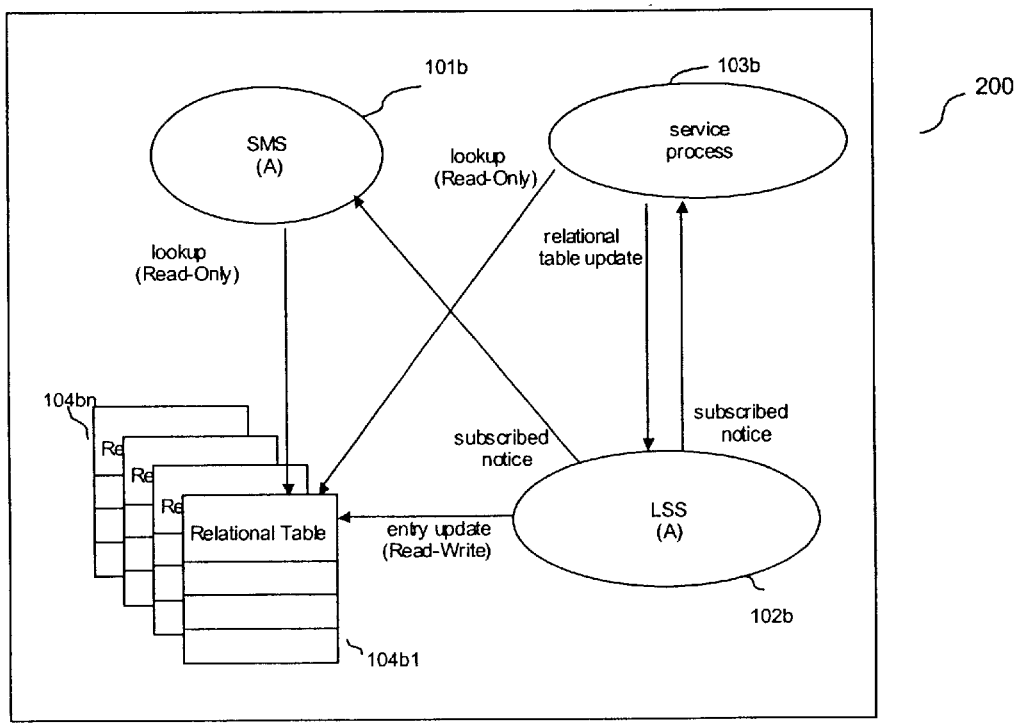
FIG. 2A is a block diagram of local update service that may be implemented in one embodiment of the invention.

FIG. 2A illustrates a block diagram 200 of a local update service according to one embodiment of the invention. In this example, the local LSS process 102b is an agent but the present invention should not be construed as being limited thereto. An LSS process, whether functioning as an agent, monitor backup, or monitor primary, provides a local update service that enables its clients (e.g., other processes residing on the same machine) to record table entries in a local relational table 104b1–104bn. An LSS process runs on every machine in the system along with at least one process, such as but not limited to a gateway (GS) service process, a metadata service (MDS) process, or a storage service process, in addition to a system management service (SMS) process all serving as clients to the LSS process. In this example, only one service process 103b is shown, but more than one process can reside on a single machine and can use the local update service provided by the LSS process.

Each client on the local machine communicates with the local LSS process over a communication path using a reliable protocol. However, the communication protocol in the client-to-LSS process direction may differ from the communication protocol in the LSS process-to-client direction. A local process update to a relational table initiates the communication in the client-to-LSS process direction, but typically a notification of some kind from the LSS process initiates the communication in the LSS process-to-client direction. Processes (in this example service process 103b) send updates to the local LSS process, and the LSS process updates a local copy of a relational table 104b1–104bn. It should be noted that the LSS maintains a separate relational table for each process sending updates, including but not limited to a local service process. In this way, an LSS process may store information on the various types of processes within a distributed computing system.

Figure 2B:
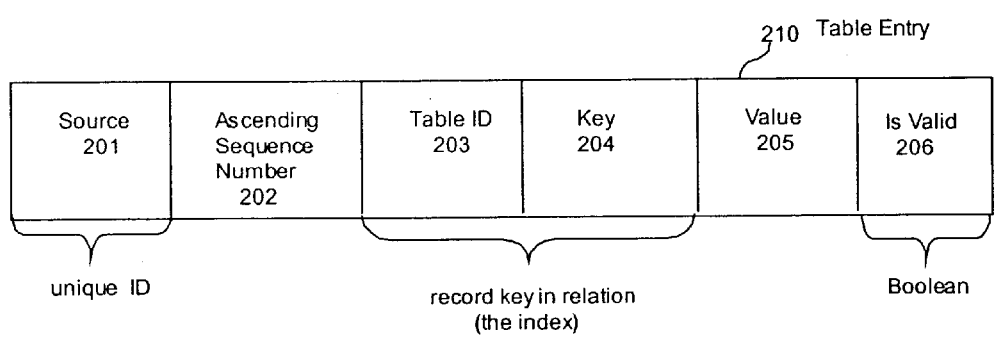
FIG. 2B is an example of an entry in a relational table that may be implemented in one embodiment of the invention.

FIG. 2B shows one example of a table entry in a relational table. Every table entry 210 sent to the LSS for recordation into a relational table may be of a common form. Namely, each relational table entry preferably includes six fields, a source ID field 201, sequence number field 202, table ID field 203, a key field 204, a value field 205, and a "valid" field 206. Of course, such a table entry and the meaning assigned to each field are representative of a particular embodiment, and the present invention should not be construed as being limited thereto. For example, the source ID field in a particular embodiment can uniquely identify the process from which the table entry is sent. The sequence number field can identify the number the LSS process assigns to the entry as the entry is updated in the local table. The table ID field 203 can identify the table to which the entry is to be added and because the LSS process on every machine maintains the same information, the table ID for a particular table type may be the same across all of the LSS processes in the system. A key field 204 can identify a particular service instance. A value field 205 may vary in form depending on the relational table being updated, for example, in a gateway process table, the value field may include a server route (for example an assigned hostname and network port) corresponding to each gateway service instance, or in a host route table that value field may include for example, a network route to a host machine where such a route can be represented by a four-octet network address. A "valid" field 206 preferably includes a Boolean value that can be checked to determine if the table entry is valid or invalid. For example, an invalid notation (e.g., a "0") in the gateway process table can indicate that the corresponding server process is not available and in the host route table can indicate that the route to a host machine is not available.

The LSS process has read-write access to the relational table while the other processes on the machine have read-only access which they use for performing lookups. Each service process or other type of process may include a shared library of various functions. These functions can be invoked to update a relational table. Some of the available library functions such as Add/Delete Entry, Key Search and Find Server, Entry Heartbeat, Subscribe/Cancel Subscription, and Route Updates, are fully described in co-pending U.S. patent application Ser. No. 09/733,059, entitled "Dynamic Server Directory for Distributed Computing System," which is assigned to the present assignee, and which is fully and completely incorporated herein by reference.

Figure 2C:
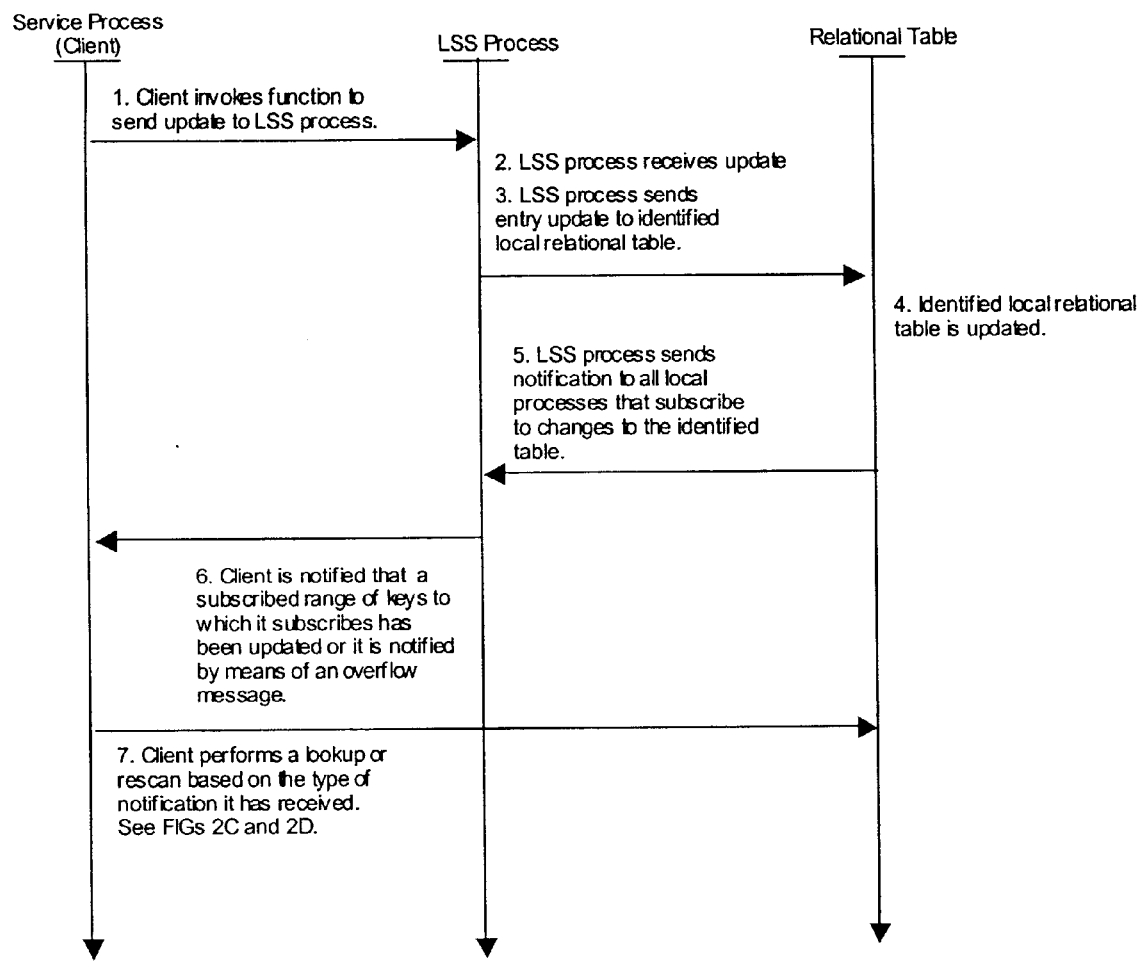
FIG. 2C is an operational diagram that shows the communication between a client, an LSS process and a relational table which is updated according to one embodiment of the invention.

FIG. 2C is an operational diagram illustrating communication between a service process, an LSS process and a relational table. In step 1, a service process invokes one of the various supported functions to send a relational table update to the local LSS process over a reliable communication path as a message. In this context, processes running locally, such as a service process and an SMS agent process (managed entity), are clients of the local LSS process. The protocol used for communication from the client to the LSS process can be any reliable protocol such as kernel primitives for process-to-process communication within a machine. In the client-to-LSS process direction, communication of updates is a blocking transfer and no loss of data can occur.

Once the LSS process receives the update from the client (step 2), the LSS process can then send an entry update to the specified local relational table (step 3) and the identified local relational table is updated (step 4). As mentioned above, the LSS process has read-write access to the relational tables. The LSS agent process keeps track of all subscriptions from its various local clients (e.g., SMS agent process 101b, service process 103b). When an update to a table matches a client subscription, the LSS Agent process sends a notice back to the client indicating that there is an update matching the subscription (step 5). Subscriptions indicate a range of key values that correspond to certain table entries of which a client requests to be notified. This means that locally a client can use a callback to be notified of updates to these table entries as a change of state occurs for the subscribed range of key values. All local processes that subscribe to an update that has been entered in the table are notified through a subscribed notice (step 6).

Figure 2D:
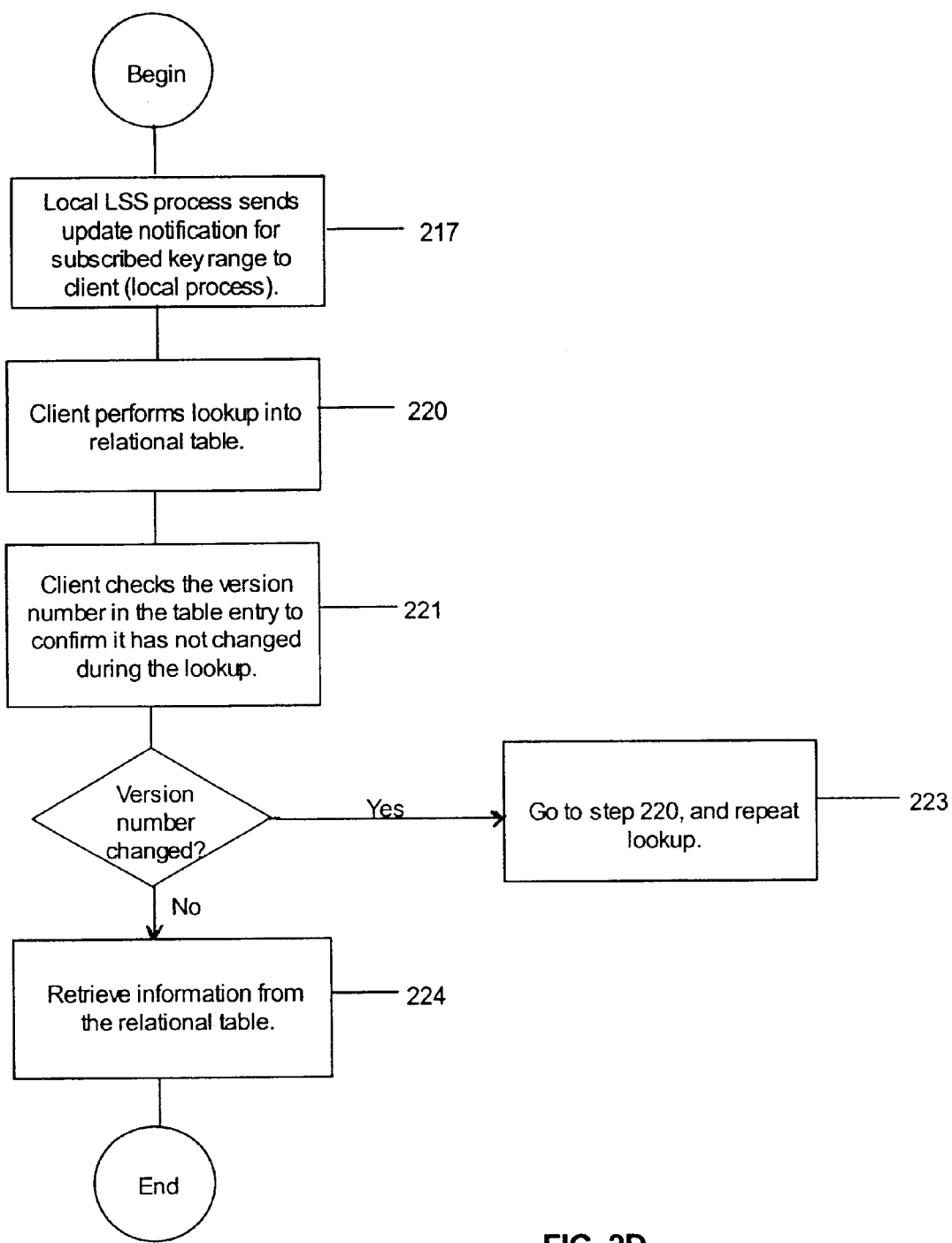
FIG. 2D is a flowchart that shows how a local process receives an update notification and performs a lookup into a relational table according to one embodiment of the invention.
Figure 2E:
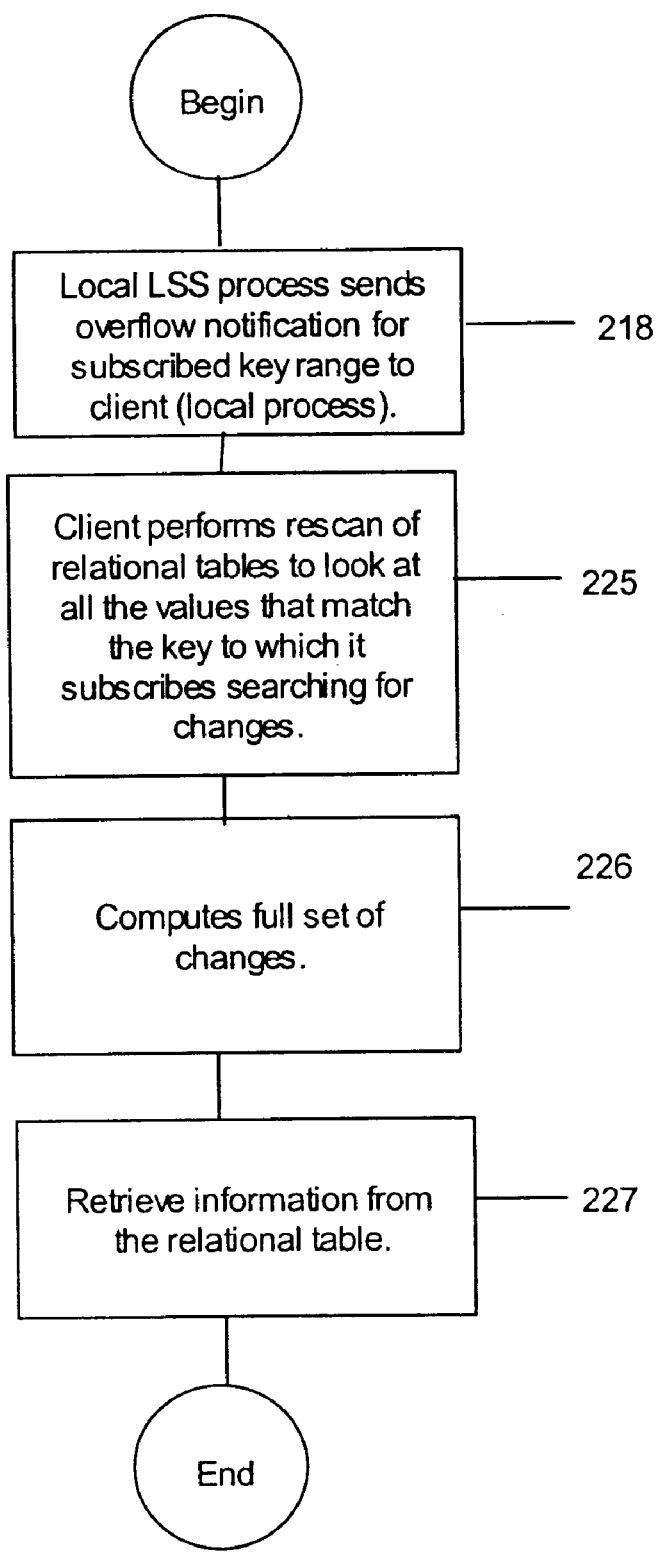
FIG. 2E is a flowchart that shows how a local process receives an overflow notification and performs a rescan of the relational tables according to one embodiment of the invention.
Figure 2F:
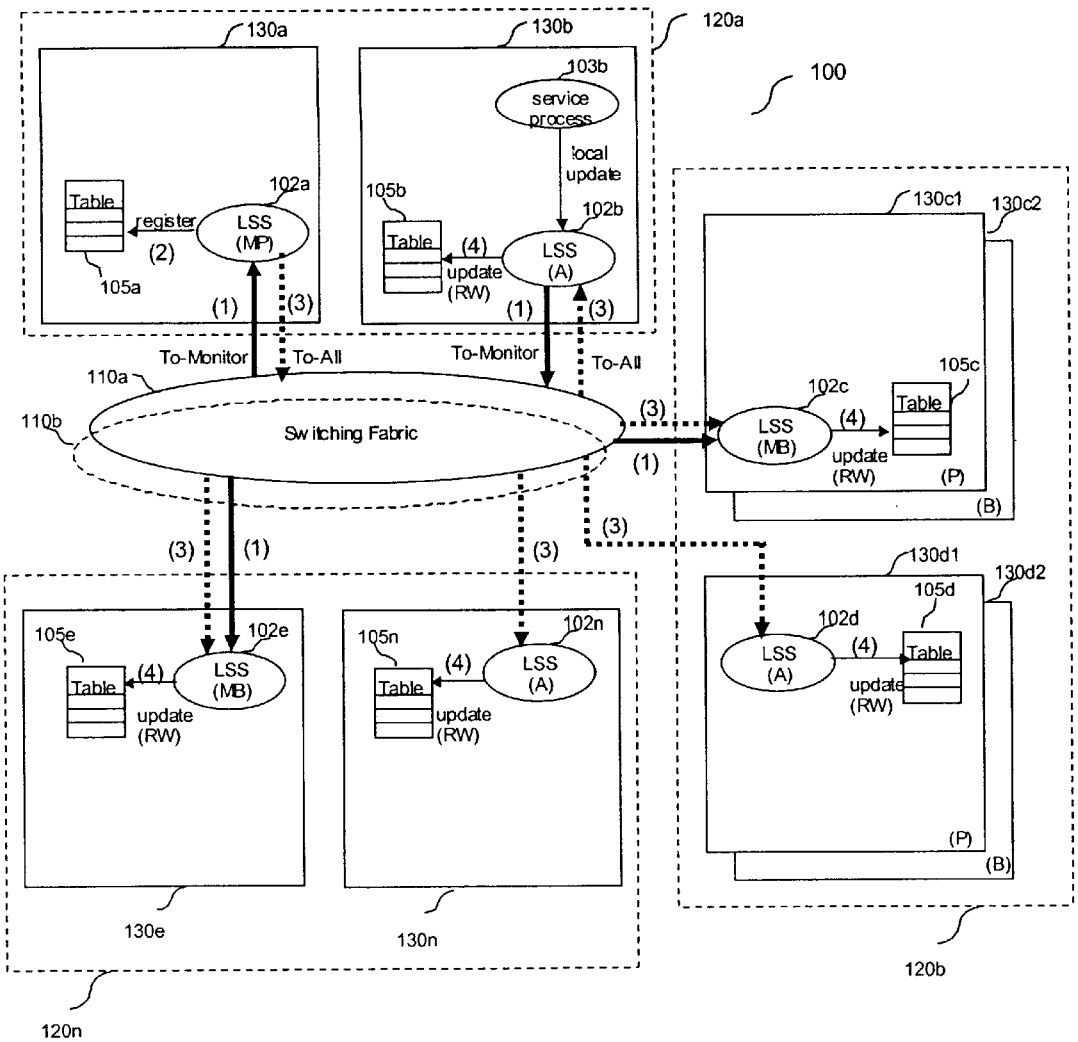
FIG. 2F is a block diagram that shows a system-wide application of the update service which causes local updates to be propagated to all other LSS processes in the system according to one embodiment of the invention.

A notification from the LSS Agent process can be, for example, a notice that indicates that a table entry for a subscribed key range has changed, or in the rare case, an overflow message indicating that subscribed notices were received but because there are so many notices, the LSS Agent process cannot send them all to the subscribing client. Subsequent to a notification, a client can perform a lookup for a subscribed key change notification to look up specific updates as shown in FIG. 2D, or can perform a rescan of the tables to look at all values that match the key to which it subscribes as shown in FIG. 2E. It should be noted that a client could perform a lookup or rescan at any time. However, a lookup or rescan is typically performed subsequent to a notification. In addition, a notification can be sent any time an update comes into the LSS Agent process from any client in the system (not just updates originating from processes on the local machine). Updates from processes that are not local, come into the LSS Agent process over a "To-All" channel from the monitor primary. A description of how updates are propagated throughout the system is shown in FIG. 2F. A notice can also be sent any time the LSS process generates an update itself, for example and without limitation, when a heartbeat from a local process is missed and the LSS process updates the valid bit as part of the heartbeat service, which is described later.

FIG. 2D illustrates how a local process may receive an update notification and perform a lookup into a relational table. The method begins when a client (i.e., any local process) receives an update notification, as shown in functional block or step 217. Upon receipt, the client may perform a lookup into a corresponding relational table, as shown in functional block or step 220. Processes on a local machine use a non-blocking coherency algorithm that allows multiple processes on the machine to perform lookups into the same or different relational tables in parallel without contention and without communication with a server. Such non-blocking coherency algorithms are known in the art. Since the present embodiment involves a single writer (the LSS Agent or Monitor) and multiple readers (processes which are clients of LSS), the algorithm used has a generation number at the top of each table, and table entries are inserted or removed or relocated in a way which never causes a lookup preformed concurrently to fail to complete. The reader checks the generation number before and after a lookup, and retries if the generation number changes. This could lead to reader starvation in the presence of a large number of updates, but this is prevented in the present application, due to limits on the rate of such changes.

Referring back to FIG. 2D, during a lookup, the client or process checks the version number that the LSS process maintains, as shown in functional block or step 221. If the LSS process updated the version number during the lookup, the process repeats the lookup, as shown in functional block or step 223. The process repeats the lookup until the version number is not updated during the lookup. Once the version number does not change, including during the lookup, the process retrieves the information from the relational table, as shown in functional block or step 224. This simple versioning lookup mechanism provides a "lightweight" strategy for processes to retrieve up-to-date data from the relational table.

FIG. 2E illustrates how a local process may receive an overflow notification and perform a rescan of the relational tables. When a client receives an overflow notification, as shown in functional block or step 218, the client may rescan the relational tables to look at all values that match the key range to which it subscribes, as shown in functional block or step 225. The rescan is essentially a batch processing mechanism that can be employed when there are a large number of updates. The rescan is an efficient method of handling a large number of updates instead of performing individual lookups. The rescan prevents the notification and lookup mechanism from failing. However, the client may compute the full set of changes that have occurred in the subscribed range of key values, as shown in functional block or step 226. The work to compute the full set of changes may be greater than a typical lookup, but it has the benefit of ensuring that events do not get lost. Once the rescan and computation is complete, the client can retrieve the updated information from the relational tables, as shown in functional block or step 227.

FIG. 2F shows a system-wide application of the update service. For a system-wide application of the update service, an LSS process causes its local updates to be propagated to all other LSS processes in the system. In order for local updates to be propagated, the local LSS process will communicate with other LSS processes in the system. The communication flow among the LSS processes is multicast over a well-known address in accordance with networking protocols such as User Datagram Protocol (UDP) for updates and Transmission Control Protocol (TCP) for downloads. These transport protocols are for purposes of illustration only, and do not limit the invention thereto. Each communication path from the LSS process (e.g., LSS agent, monitor backup, monitor primary) into the switching fabric has two multicast channels: the "To-Monitor" channel and the "To-All" channel. LSS agents and monitor backups use the To-Monitor channel to multicast their local updates to the monitor primary, that is, any information developed locally at the LSS agent or monitor backups must reach the monitor primary for further propagation. The local update may occur in a fashion similar to that described in FIG. 2B. However, preferably after the LSS process has updated its local relational table, the LSS process sends this update over the switching fabrics, e.g., fabrics 110a–110b. For simplicity, only communication over a single switching fabric is shown, however, this invention should not be construed as limited thereto. In the preferred embodiment, the monitor backups and, LSS agents do need not keep track of which LSS process is the monitor primary, and at any time a monitor backup may become the monitor primary. As a result, updates are multicast over the To-Monitor channel so that all monitors (i.e., monitor primary and monitor backups) receive the update (step (1)). When the current monitor primary receives an update on the To-Monitor channel, it registers the update in the relational table (i.e., relational table 105a) on the monitor primary machine (step (2)), and then multicasts the update over the To-All channel to redistribute it to all LSS processes, including the monitor backups (step (3)). This communication flow, multicast over the To-Monitor and To-All channel, has several bene fits. Multicast requires only a single message with the update information to be sent over the network to reach all LSS processes, which makes the communication lightweight and removes the requirement of $N^2$ connections to send the update information to all necessary processes, as found in prior art implementations. In addition the multicast communication from the LSS agent or monitor backup (functioning as an agent) to the monitor primary over the To-Monitor channel is efficient and fault tolerant. By way of example and without limitation, the multicast communication is efficient in that the agents do not need to keep track of the location of the currently running monitors because a multicast message will get to all of them essentially performing discovery, and the multicast communication is fault tolerant in that if the monitor primary changes over time or a monitor primary migrates to another machine, the LSS agents continue to operate the same. Once an LSS process receives an update on the To-All channel, it can send an update to its respective local relational table 105b–105n (step 4). In this manner, the local update service, as shown in FIGS. 2A–2E and described above, may become operational.

Heartbeat Service

The LSS processes provide an infrastructure that is key to low latency recovery from failure by promptly delivering a notice of failure. Central to low latency recovery from failure in the present invention is a "heartbeat" service. A heartbeat service is a mechanism that keeps the LSS processes apprised of the operability of other processes running in a distributed computing system. The emphasis of the heartbeat service is recovery and prompt detection of failed links and machines. The LSS infrastructure does not enforce low latency recovery. Enforcement can be provided, for example, by upper layer communication software and can be triggered by receipt of notices of failure supplied by the heartbeat service. The upper layer is not within the scope of this invention and will not be described in detail herein. However, the types of failure, whether failure is at the application level (that is, between a local process and the LSS process on the same machine) or the route-level (that is, between the switching fabric and the machine), and whether the failure is one for which the LSS infrastructure provides notification are pertinent to the invention for purposes of illustrating its operation.

Fundamental to the heartbeat service are heartbeat messages. Heartbeat messages are sent across the switching fabric using reliable communication to distribute operability information about the components. Since the switching fabric is a network, a single message in itself is not reliable. Networks, and more particularly networks that involve IP packet traffic such as those which may be used in combination with the present invention, require some amount of acknowledgments, retransmissions, or some other overhead mechanisms to cause the communication to be reliable. Fundamentally, networking protocols are time based, meaning that if packets are sent to a target and the target never responds, after some period of time the target (or route to the target) is declared inoperable. In typical networks that use an arbitrary Internet-style routing fabric, the switching fabric itself or networking software in any one of the machines could drop packets at any given time. In one embodiment of the present invention, switched L2 packet switches and the volume for the traffic, or the speed of the interface relative to the speed of the processors, may be such that traffic loads can be processed without overflows, minimizing dropped packets. In addition, using IP switching fabrics as a back plane in lieu of a conventional multiprocessor computer back plane allows the switching fabrics to be used with a controlled, well-formed load. In light of this special type of EP back plane, low packet loss is expected.

Within every heartbeat message is a heartbeat interval value, that is, the amount of time that can elapse before 1) the local LSS process should expect the next message from the local client, 2) the monitor primary should expect the next message from an LSS process over the To-Monitor channel, or 3) the LSS process should expect the next message from the monitor primary over the To-All channel. This heartbeat interval, which bounds the failure time, is configurable. In a preferred embodiment of the present invention, a local process is declared down or inoperable if the local LSS process fails to receive a heartbeat message for a single heartbeat interval, and a route is declared down or inoperable if the monitor primary fails to receive packets or heartbeat messages from an LSS process for two heartbeat intervals on the To-Monitor channel or an LSS process fails to receive packets or heartbeat messages from the monitor primary on the To-All channel. This means that one heartbeat interval bounds the latency for discovering a failure at the application level and two heartbeat intervals bound the latency for discovering a failure at the route level. A preferred route-level heartbeat interval can be a half second while a preferred application-level heartbeat interval may be longer than ten seconds. The overhead related to heartbeats traversing the network (route-level heartbeats) is minimal. When traffic is heavy, there is no overhead at all. When traffic is light, there are always heartbeat messages. However, the LSS process resident on every machine sends only one message across the network per heartbeat interval. In this embodiment, the relational table that is updated with heartbeat information is the host route table, but the invention is not limited thereto.

Every LSS process sends out a heartbeat message per heartbeat interval. The monitor primary and monitor backups receive n messages because they receive a message from every LSS process over the To-Monitor channel. The LSS agents receive a message from each of the monitor primary and monitor backups and the number of fabrics increases this number because the monitors send a message on each fabric. For example, if a system has two monitors (a monitor primary and a monitor backup) and two fabrics, each LSS agent receives four messages per heartbeat interval. Thus, for most machines there are only a few packets per second of overhead.

Locally, a client can send from its port to its local LSS process a heartbeat message to indicate it is operable (ready for service). A heartbeat message controls whether the LSS process sets the "valid" field in a table entry in its local host route table to be valid or invalid. It should be noted that how a process causes a heartbeat to imply that it is operable is a decision that is strictly internal to the process itself. For example, if the process is an event loop, it is common to handle an operation every so many times around the event loop, or in the case of a multithreaded process, some other techniques may be required such as monitoring that all threads are making progress before the process can guarantee that it can provide the service. The internal requirements that a process must meet before it can send a heartbeat to imply that it is operable is outside the scope of the invention, the important point is that the local process should be able to send a heartbeat message to indicate it is ready for service.

For the heartbeat service, an LSS process multicasts heartbeat messages at the configured heartbeat interval and multicasts local updates it makes to the local host route table if the state of an entry is changed. The state of a host route table entry changes when it is first created (as when the host first starts up or when a network interface is newly recognized), when an LSS process determines that the network interface has become unusable after being usable (entry is set Invalid) or usable after being unusable (entry is set Valid), or when the entry is deleted (when a network interface is removed). For example, if an application-level failure occurs, that is, the local LSS process does not receive a heartbeat within the configured heartbeat interval from a local process, the local LSS process generates an update of its own to change the Boolean value of the "valid" field of the associated table entry in the local host route table to Not Valid (e.g., "0"). In the case of a first-time startup, failure, or recovery, the LSS process multicasts the state change over the To-Monitor channel so that all monitors (monitor primary and monitor backups) receive the update and the monitor primary can multicast the update over the To-All channel to redistribute it to all LSS processes in the system, including the monitor backups. Like other types of updates from a local client, new host route table entries and updates generated by an LSS process, such as missed heartbeats that change state, cause the LSS process to also propagate notices to all of its local processes that subscribe to this key value range. In addition, any subscribing local clients of LSS processes receiving the update on the To-All channel are also notified. In this way, new host route table entries signifying new processes on a machine, missed heartbeats at the application level, or recovery of failure, that is, any state change is propagated throughout the system very quickly.

One type of failure for which the LSS is responsible for delivering a notice is physical connectivity (i.e., machine failure). The host route table maintains addresses for each host. Every host has a unique ID that is derived from a hardware serial number peculiar to that particular machine. From that unique ID, a logical name for the machine is derived and an arbitrary address (preferably an IP address) for communication purposes is assigned using an address resolution protocol preferably Dynamic Host Control Protocol (DHCP). Each LSS process adds to the host route table the mappings of all of the interfaces on its machine. (These interfaces are shown in FIG. 1 as 160a1–160an–160n1–160nn.) Other tables may contain entries for a particular service and map to a particular Table ID for that service. Upper layer communication software, monitors communication endpoints between elements of the system and monitors updates to the host route table. When the upper layer is notified that the physical connection to a host has failed as indicated by the "valid" field being set to Invalid, it causes any transactions that are pending on those endpoints to fail and closes the endpoints. All callers are expected to automatically redo their connections at this level, which means they retranslate and find a new address, which may be on a different machine. If it is determined that only an interface has failed, the caller simply uses the interface to the same machine via the other switching fabric.

Another type of failure is at the service level, that is, a process failure. In this case, the process stops sending heartbeat messages, which could result in the use of a backup process (in a primary/backup scenario) or in a backup being recreated on another node. The recreated process would replace the table entry in the host route table, or in the case of a backup process taking over for a failed primary process, the entry may already be in the host route table.

The upper layer communication software may be insensitive as, to which type of failure has occurred, e.g., physical connectivity failure or service failure. The upper layer communication software may perform a full lookup, that is a service level lookup, which would require using an interface on another switching fabric and a physical level lookup, which includes retranslation and finding a new address.

Users of the host route table (e.g., processes tasked with establishing and maintaining connections) use the "valid" field information to promptly cause connections to fail, instead of waiting for a timeout to elapse (e.g., a TCP/IP timeout—a common mechanism used to determine connection failure in networked systems). The users of the tables can then resolve the address through the host route table to locate a newly valid resolution and reestablish the connection and retry their permutation. Address resolution and connection re-establishment using various functions and relational tables are fully described in co-pending U.S. patent application Ser. No. 09/733,059, entitled "Dynamic Server Directory for Distributed Computing System," which is assigned to the present assignee and which is fully and completely incorporated herein by reference.

Heartbeat messages are bi-directional. Every LSS process that is functioning as an LSS agent sends a heartbeat message to the monitor primary on the To-Monitor channel and the monitor primary sends a heartbeat message to the LSS agent in the system on the To-All channel. A route is declared inoperable if either an LSS agent does not receive packets on the To-All channel for two heartbeat intervals or the monitor primary does not hear packets from an LSS Agent for two heartbeat intervals. As will be described more fully below, if the monitor primary fails to receive a data packet or heartbeat message (that is, a single heartbeat message is missed), a Negative Acknowledgment (NAK) is promptly sent out indicating that the monitor primary is missing a packet. A NAK should elicit an immediate response from the LSS agent. If the monitor primary still does not receive a response, the monitor primary declares the route inoperable and sends this information to all of its LSS agents. Similarly, if an LSS agent does not receive packets from the monitor primary after two heartbeat intervals, it declares the route invalid. The monitor primary separately tracks whether it has heard packets and whether it has heard packets from an LSS agent that has declared the route is down. For example, if the LSS agent declares the route valid, the monitor tracks this information separate from whether it has heard packets from the agent. A monitor primary will not set the route valid inside the table entry it multicasts until it believes that the route is valid. If all routes to a host are lost, this implicitly defines that the server is inoperable. The SMS Server (management entity), which is watching for this table, will notice that all routes are inoperable and will take action. The action may include without limitation power cycling the machine to see if it will become operable again. At the application level, if a given service becomes inoperable, the management entity for that service is responsible for taking an action at its level to recover. The action may include without limitation terminating the service process and restarting it using higher-level services. Meanwhile the LSS agent is simply reporting the activities that have occurred. The LSS infrastructure is designed to be a real-time service, the management and managed entities, which are separate, are intended to be an off-line service. Although management and managed entities. respond promptly, there is no critical timing (other than heartbeat messages) related to how the management and managed entities do their work. Being an off-line service allows management and managed entities to accommodate activities that take an unpredictable amount of time.

In one embodiment of the present invention, the reliable multicast protocol sequences the stream of packets from a source. That is, packets from a source on a multicast channel, either To-Monitor or To-All, are labeled with a source and sequence number. Any time packets in a given direction are not sent within the heartbeat interval, an extra heartbeat packet is sent. The heartbeat message does not increment the sequence number; it repeats the sequence number. This is not a full retransmission, instead it is an idle bit and a sequence number indicating that the source is still present and the last message it sent.

FIGS. 3A–3E illustrate the use of sequence numbers in data packets and heartbeat messages to indicate normal operation or dropped packets when using reliable multicast. It is important to note that all updates are mediated through a monitor primary and as such, they are ordered.

In normal operation using reliable multicast, a receiver 301 receives a heartbeat message from a source 302 (i.e., over a To-Monitor or To-All channel). The heartbeat message may have a sequence number that matches the sequence number of the last message (heartbeat or data). Alternately, the receiver 301 may receive a new data packet with the next sequence number in order, that is, the sequence number incremented by one from the last data packet.

Figure 3A:
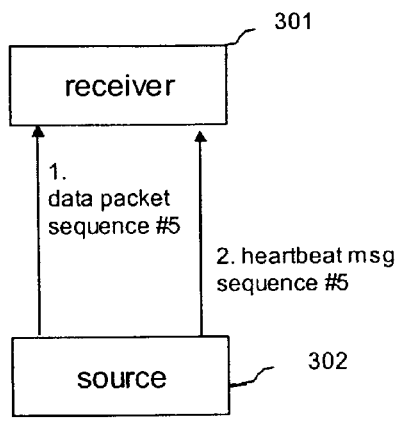
FIGS. 3A and 3B are block diagrams that show the use of sequence numbers in data packets and heartbeat messages to indicate normal operation when using reliable multicast according to one embodiment of the invention.

In FIG. 3A, a receiver 301 receives a new data packet with sequence #5 from source 302 (step 1), and then receives a heartbeat message with sequence #5 from source 302 (step 2). This sequence indicates normal operation.

Figure 3B:
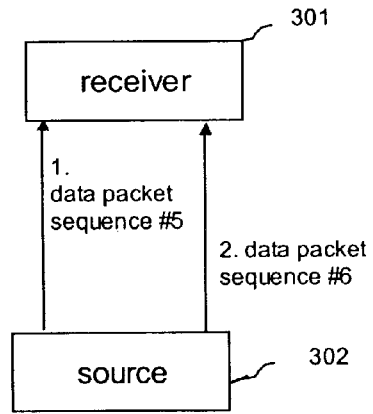

In FIG. 3B, receiver 301 receives a new data packet with sequence #5 from source 302 (step. 1), and then receives a data packet with sequence #6 (step 2). This sequence also indicates normal operation.

Figure 3C:
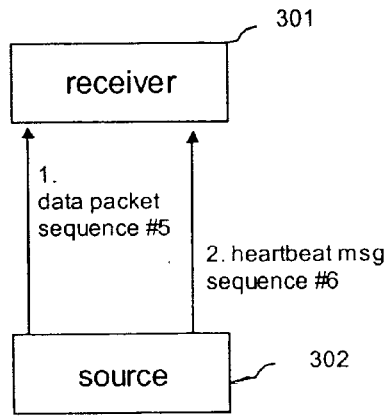
FIGS. 3C and 3D are block diagrams that show the use of sequence numbers in data packets and heartbeat messages to indicate dropped packets when using reliable multicast according to one embodiment of the invention.

In FIG. 3C, receiver 301 receives a new data packet with sequence #5 from source 302 (step 1), and then receives a heartbeat message with sequence #6. This sequence indicates that data packet with sequence #6 has been dropped.

Figure 3D:
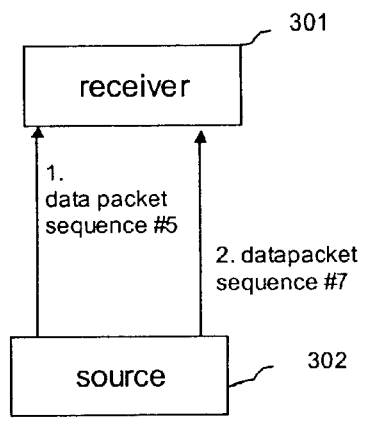

In FIG. 3D, receiver 301 receives a new data packet with sequence #7 from source 302, but the last data packet received had sequence #5. This sequence indicates that data packet #6 was dropped. Because reliable multicast requires that a heartbeat message should be received in a fixed amount of time since the last data packet or another data packet (in order), the reliable multicast protocol assumes within one heartbeat interval that a data packet or heartbeat message has been lost. As soon as a data packet or heartbeat message is determined to have been lost, the receiver sends back a Negative Acknowledgement (NAK), which includes the last data packet we saw in the correct sequence.

Figure 3E:
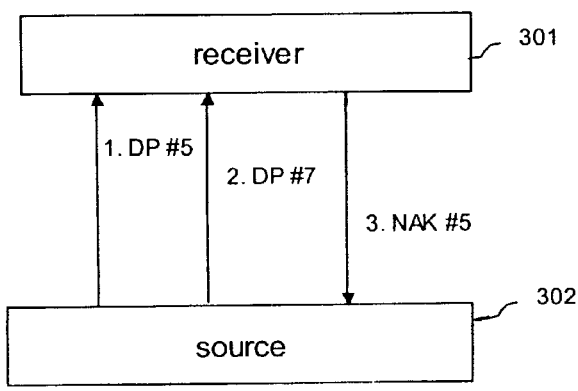
FIG. 3E is a block diagram that shows the use of sequence numbers in data packets and negative acknowledgements (NAK) to indicate dropped data packets when using reliable multicast according to one embodiment of the invention.

In FIG. 3E, the receiver 301 received the data packet with sequence #5 (step 1) from a source 302 and then received data packet #7 (step 2). The receiver returns a NAK with sequence #5 (step 3) indicating that the last data packet received under normal operation was the data packet with sequence #5 because the receiver 301 never received data packet or heart message with sequence #6. Upon receipt of the NAK, the sender is responsible for retransmitting the dropped packet(s). The sender can multicast the dropped packets or can send them to a particular destination on the same port number as unicast. The decision for sending multicast or unicast depends on whether it is likely that the packet(s) was dropped to multiple recipients or a single recipient. If it were likely that the packet(s) was dropped to multiple recipients, it would be more efficient to multicast the retransmission. If it were unlikely that the packet(s) was dropped to multiple recipients, it would be better to retransmit the dropped packet(s) using unicast because that would avoid unnecessary processing of retransmissions on machines that received the packet. In a preferred embodiment of the present invention, the source will retransmit all missing packets sent subsequent to the sequence contained in the NAK. The invention does not prevent selective retransmissions of individual packets. However, since the expectation of a dropped packet is low, due to the preferred design of the switching fabric, sending all missing packets is more efficient.

In a preferred embodiment of the present invention, the source can retransmit packets because it maintains a history of recent packets sent. The number of sent packets the source maintains is preferably bound by the amount of memory. The source maintains a certain number of packets and if the NAK sent by the receiver contains a sequence number of a packet in that range, the source sends all the packets forward of the sequence number contained in the NAK. If the NAK contains a sequence number that is older than oldest one maintained by the source, then the source enters download mode and sends a special protocol message called port reset (a reset sequence number packet) requesting a specific receiver to reset the sequence number as if the receiver received the packet with the sequence number contained in the NAK and all packets before it. In the preferred embodiment, the port reset message is always unicast. In addition to resetting the sequence number, the receiver places itself in download mode. When a receiver places itself in download mode, it sets a special. "packets dropped" indicator in the entire table space (i.e., all tables) that indicates that the tables' state information may not be up to date at this time. The monitor primary then establishes a TCP connection to the receivers and reloads the tables. All tables are reloaded when packets are dropped since it is unknown which tables were affected. As soon as the receivers are up to date, they update their respective tables' states as current and apply all future updates to the table. During the download, the receivers can continue to receive updates. The sequence number serves another purpose in this case. The receivers will not apply updates that are older (whether through download or normal operation) than the sequence number they already have. This practice allows the normal multicast traffic sent to the receivers to be applied during the download. Using sequence numbers in this manner prevents overwriting updates that have already been applied. Thus, allowing receivers to "catch up" when too many packets are lost.

In the case of a machine booting up for the first time (with message sequence #0), unless the receiver machine came up immediately following the source machine, the receiver machine will appear to have missed the first two packets. In addition, all receiver machines in a computing system that is starting up for the first time will appear to miss the first two packets. But, in a computing system that has been up for a long time, a receiver machine that reboots will always place itself in download mode, because it has no history and it needs to be "caught up."

As described earlier in the context of the update service, the originating node of each table entry (identified as the source with a unique ID) is the authority for an entry. Normally, the source would only add or delete that entry while the LSS agent is responsible for marking an entry valid or invalid. Indeed for anything other than host route table entries, the authority for entries is vested in the node that entered them into this distributed table until that node fails. A management entity can still overwrite that so that anyone in the network can delete the entry, but the LSS Agent will only mark the entry as invalid or valid. For host route table entries, authority is still with the monitor primary except when determining whether a link has become inoperable, which requires both sides (monitor primary and LSS Agent) to see packets. For example, if an LSS agent can receive packets from the monitor primary but the monitor primary cannot see any packets from the LSS agent, a one-sided failure has occurred. The monitor primary will not indicate that this route is available because the communication is not bi-directional. This is the only case where the monitor primary participates in setting the valid bit. However, the monitor primary maintains a per agent connection state table about the LSS agent's view of the connection. If either the LSS agent or the monitor primary indicate that the route is inoperable, the monitor primary multicasts to all the LSS agents (and monitor backups) that the route is inoperable.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications. It should be further apparent to those skilled in the art that the various embodiments are not necessarily exclusive, but that features of some embodiments may be combined with features of other embodiments while remaining with the spirit and scope of the invention.

What is claimed is:

1. A system for monitoring state information in a distributed computing system, including a plurality of nodes which are coupled together by at least one switching fabric, comprising:

an update service including a plurality of local applications, each of the local applications respectively residing on a unique one of the plurality of nodes and being adapted to record and update state information from local clients in a local relational table, and a system-wide application which is adapted to propagate the updated state information across the distributed computing system to a plurality of the local relational tables.

2. The system of claim 1 wherein the update service comprises:

a primary monitor service which resides on a unique one of the plurality of nodes and which is adapted to provide the local application on that node and the system-wide application.

3. The system of claim 2 wherein the update service further comprises:

at least one backup monitor service which resides on at least one of the plurality of nodes and which is adapted to provide the local application on that at least one node and to selectively act as the primary monitor service to provide the system-wide application.

4. The system of claim 3 wherein the update service further comprises:

at least one agent service which resides on at least one of the plurality of nodes and which is adapted to provide the local application on that at least one node.

5. The system of claim 4 wherein the local applications are adapted to communicate updates to the primary monitor service and the at least one backup monitor service over a first multicast channel, and wherein the primary monitor service is adapted to record the updates in its local relational table and to communicate the updates to all services over a second multicast channel.

6. The system of claim 1 wherein each of the local applications maintains subscriptions from local clients, and notifies each local client when an update matches a subscription of that clients.

7. The system of claim 6 wherein each local client has read access to a corresponding local relational table.

8. The system of claim 1 further comprising:
a heartbeat service which is adapted to selectively generate and receive messages throughout the system to indicate whether the components of the system are operating normally.

9. The system of claim 8 wherein the heartbeat service comprises:
a plurality of processes which respectively reside on the plurality of nodes and which are adapted to receive messages indicating that the local clients are operating normally.

10. The system of claim 9 wherein the plurality of processes comprise a monitor process which is adapted to receive messages from the remaining processes indicating that the respective routes between the monitor process and the remaining processes are operating normally.

11. The system of claim 10 wherein the monitor process records information regarding the operation of the respective routes in a relational table.

12. A distributed file system comprising:
at least one switching fabric;
a plurality of nodes which provide at least one file system service process, and which are communicatively coupled together by the at least one switching fabric;
a plurality of local update service applications that respectively reside upon the plurality of nodes and which update state information from local clients on the plurality of nodes in a plurality of local relational tables; and
a system wide update service application which communicates updated state information across the distributed computing system to a plurality of the local relational tables.

13. The distributed file system of claim 12 wherein the at least one file system service process comprises one or more of the following: a metabase service process, a storage service process and a gateway service process.

14. The distributed file system of claim 12 wherein the system wide update service application comprises a primary monitor service which resides upon a unique one of the plurality of nodes and which further provides the local update service application on that node.

15. The distributed file system of claim 14 wherein the system wide update service application further comprises a backup monitor service.

16. The distributed file system of claim 14 wherein the plurality of local update service applications are provided by a plurality of agent services which communicate updates to the primary monitor service over a first multicast channel, and wherein the primary monitor service is adapted to record the updates in its local relational table and to communicate the updates to all services over a second multicast channel.

17. The distributed file system of claim 12 wherein each of the local update service applications maintains subscriptions from local clients, and notifies each local client when an update matches a subscription of that client.

18. The distributed file system of claim 12 further comprising:
a heartbeat service which is adapted to selectively generate and receive messages throughout the system to indicate whether the components of the system are operating normally.

19. The distributed file system of claim 18 wherein the heartbeat service comprises:
a plurality of processes which respectively reside on the plurality of nodes and which are adapted to receive messages indicating that the local clients are operating normally.

20. The distributed file system of claim 19 wherein the plurality of processes comprise a monitor process which is adapted to receive messages from the remaining processes indicating that the respective routes between the monitor process and the remaining processes are operating normally.

21. The distributed file system of claim 20 wherein the monitor process records the information regarding the operation of the respective routes in a relational table.

22. A method of monitoring the state of components in a distributed computing system including a plurality of interconnected service nodes each having at least one local client, the method comprising the steps of:
monitoring the state of the local clients on each service node;
updating information relating to the state of the local clients in a plurality of local relational tables respectively residing on the plurality of service nodes; and
communicating the updated state information across the distributed computing system to the local relational tables on the service nodes over a multicast channel.

23. The method of claim 22 further comprising the step of:
providing each of the local clients with read access to a corresponding local relational table.

24. The method of claim 23 further comprising the steps of:
receiving subscriptions from each of the local clients; and
notifying each local client when an update matches a subscription of that client.

25. The method of claim 22 further comprising the step of:
providing a primary monitor service which resides on a first service node and which is adapted to record updates in at least one local relational table residing on the first service node, and to communicate updates to other relational tables on other service nodes over the multicast channel.

26. The method of claim 25 further comprising the step of:
providing at least one backup monitor service which resides on at least one second service node, and which is adapted to record updates in at least one local relational table residing on the at least one second service node, and to selectively act as the primary monitor service.

27. The method of claim 26 further comprising the step of:
providing at least one agent service which resides on at least one third service node and which is adapted to record updates in at least one local relational table residing on the at least one third service node.

28. The method of claim 27 further comprising the step of:
communicating updates to the primary monitor service and the at least one backup monitor service over a first multicast channel; and
communicating updates to all services over a second multicast channel by use of the primary monitor service.

29. The method of claim 22 further comprising the steps of:
causing the components of the system to generate messages spaced apart by predetermined intervals indicating that the components are operating normally;

receiving the generated messages; and determining whether the components are operating normally based upon the messages received.

30. The method of claim 29 further comprising the step of:

providing a plurality of processes that each respectively resides on one of the plurality of nodes and that is adapted to receive messages from components local to that node and to determine whether the components local to that node are operating normally.

31. The method of claim 30 wherein the plurality of processes comprises a monitor process which is adapted to receive second messages from the other processes indicating that the respective routes between the monitor process and the remaining processes are operating normally.

32. The method of claim 31 further comprising the step of:

recording the information regarding the operation of the respective routes in a relational table.

* * * * *